United States Patent
Rickett et al.

(10) Patent No.: US 10,551,517 B2
(45) Date of Patent: Feb. 4, 2020

(54) MULTIPLES MITIGATION AND IMAGING WITH INCOMPLETE SEISMIC DATA

(71) Applicant: WesternGeco L.L.C., Houston, TX (US)

(72) Inventors: James E. Rickett, Cambridge (GB); Clement Kostov, Houston, TX (US); Anna Marjatta Makinen, Cambridge (GB)

(73) Assignee: WESTERNGECO L.L.C., Houston, TX (US)

(*) Notice: Subject to any disclaimer, the term of this patent is extended or adjusted under 35 U.S.C. 154(b) by 0 days.

(21) Appl. No.: 15/509,076

(22) PCT Filed: Sep. 4, 2015

(86) PCT No.: PCT/US2015/048456
§ 371 (c)(1),
(2) Date: Mar. 6, 2017

(87) PCT Pub. No.: WO2016/037022
PCT Pub. Date: Mar. 10, 2016

(65) Prior Publication Data
US 2017/0248714 A1 Aug. 31, 2017

Related U.S. Application Data

(60) Provisional application No. 62/046,026, filed on Sep. 4, 2014.

(51) Int. Cl.
*G01V 1/28* (2006.01)
*G01V 1/30* (2006.01)
*G01V 1/36* (2006.01)
(52) U.S. Cl.
CPC ............. *G01V 1/282* (2013.01); *G01V 1/301* (2013.01); *G01V 1/306* (2013.01); *G01V 1/36* (2013.01);
(Continued)

(58) Field of Classification Search
CPC .......... G01V 1/301; G01V 1/306; G01V 1/36; G01V 1/282; G01V 2210/679;
(Continued)

(56) References Cited

U.S. PATENT DOCUMENTS 5,079,749 A 1/1992 Aminzadeh et al.
5,873,050 A 2/1999 Schneider, Jr. et al.
(Continued)

FOREIGN PATENT DOCUMENTS

| CN | 101598809 A | 12/2009 |
|---|---|---|
| CN | 102169189 A | 8/2011 |
| WO | WO2005019868 A1 | 3/2005 |

OTHER PUBLICATIONS

Berkhout, A. J. et al., "Full wavefield migration utilizing surface and internal multiple scattering", 2011 SEG Annual Meeting, Society of Exploration Geophysicists, 2011, pp. 3212-3216.
(Continued)

*Primary Examiner* — Bryan Bui (57) ABSTRACT

Synthetic survey data is generated using a two-way or one-way wave propagator based on a current model of a target structure. The current model is modified to reduce a difference between the synthetic survey data and observed survey data, while maintaining unchanged a velocity component of the current model, where the modifying of the current model produces a modified model. The modified model is used to reduce an adverse effect of multiples in the target structure, or to promote a favorable effect of multiples in the target structure.

23 Claims, 6 Drawing Sheets (52) U.S. Cl.
CPC .... *G01V 2210/512* (2013.01); *G01V 2210/56* (2013.01); *G01V 2210/622* (2013.01); *G01V 2210/64* (2013.01); *G01V 2210/675* (2013.01); *G01V 2210/679* (2013.01)

(58) Field of Classification Search
CPC .......... G01V 2210/75; G01V 2210/56; G01V 2210/512; G01V 2210/622; G01V 2210/64
See application file for complete search history.

(56) References Cited

U.S. PATENT DOCUMENTS

| | | | |
|---|---|---|---|
| 6,219,621 | B1 | 4/2001 | Hornbostel |
| 8,570,831 | B2 | 10/2013 | Teague et al. |
| 9,448,316 | B2 | 9/2016 | Zhang et al. |
| 2009/0006054 | A1* | 1/2009 | Song ............... G01V 1/282 703/6 |
| 2011/0131020 | A1* | 6/2011 | Meng ............... G01V 1/303 703/2 |
| 2012/0073825 | A1 | 3/2012 | Routh |
| 2012/0215506 | A1 | 8/2012 | Rickett et al. |
| 2012/0253758 | A1 | 10/2012 | Lazaratos et al. |
| 2013/0242696 | A1 | 9/2013 | van Groenestijn et al. |
| 2016/0084977 | A1* | 3/2016 | Rickett ............. G01V 1/282 702/17 |

OTHER PUBLICATIONS

Dai, W. et al., "Multi-source least-squares reverse-time migration", PhD thesis, King Abdullah University of Science and Technology, Geophysical Prospecting, 2012, 60, pp. 681-695.

Guitton, A. "On the Velocity-density Ambiguity in Acoustic Full-waveform Inversion", 76th EAGE Conference and Exhibition, 2014, 5 pages.

Liu, Y. et al., "Reverse time migration of multiples for subsalt imaging", Geophysics, 2012, 76(5), WB209-WB216.

Matson, K. et al., "Removal of elastic interface multiples from land and ocean bottom data using inverse scattering." 66th SEG meeting, Denver, Colorado, USA, Expanded Abstracts, 1996, pp. 1526-1530.

Pica, A. "One Way for Modelling Primaries and Internal Multiples with the Two-way Wave Equation and Its Collateral Benefits", 76th EAGE Conference and Exhibition, 2014, 5 pages.

Ramirez, A. C. et al., "An inverse scattering internal multiple elimination method: Beyond attenuation, a new algorithm and initial tests." SEG Expanded Abstracts, 2005, pp. 2115-2118.

Stork, C. et al., "Predicting and removing complex 3D surface multiples with WEM modeling—an alternative to 3D SRME for wide azimuth surveys?", SEG Technical Program Expanded Abstracts, 2006, pp. 2679-2683.

Tu, N. et al., "Fast least-squares migration with multiples and source estimation", 75th EAGE Conference & Exhibition Incorporating SPE EUROPEC 2013, 5 pages.

Wang, K. et al., "Simultaneous full-waveform inversion for source wavelet and earth model", SEC Tehcnical Program Expanded Abstracts, 2009, 5 pages.

Zhang, D. et al., "Least-squares reverse time migration of multiples", Geophysics, 79(1), pp. S11-S21.

EP Partial Supplementary European Search Report of European Patent Application No. 15837758.0 dated Mar. 21, 2018, 12 pages.

International Search Report and Written Opinion of International Patent Application No. PCT/US2015/048456 dated Nov. 9, 2015, 18 pages.

International Preliminary Report on Patentability of International Patent Application No. PCT/US2015/048456 dated Mar. 16, 2017, 15 pages.

EP Extended Search Report of European Patent Application No. 15837758.0 dated Jul. 24, 2018 (11 pages).

Groenestijn et al., Estimation of primaries by sparse inversion applied to up/down wavefields, SEG Technical Program Expanded Abstracts, Oct. 25, 2009, pp. 3143-3147.

Office Action issued in the related CN Application 201580055456.0, dated Jun. 5, 2018 (29 pages).

Zhang, D. L., et al. "Multiples Least-squares Reverse Time Migration." 75th EAGE Conference & Exhibition Incorporating SPE EUROPEC 2013, London, UK, Jun. 10-13, 2013, (5 pages).

* cited by examiner

MULTIPLES MITIGATION AND IMAGING WITH INCOMPLETE SEISMIC DATA

BACKGROUND

Seismic surveying is used for imaging subterranean sections and/or identifying subterranean elements of interest, such as hydrocarbon reservoirs, freshwater aquifers, gas injection zones, and so forth. In seismic surveying, seismic sources are activated to generate seismic waves directed into a subsurface structure.

The seismic waves generated by the seismic sources travel into the subsurface structure of the Earth, with a portion of the seismic waves being reflected back by the subsurface rock structures to the surface where they are received by seismic sensors (e.g. geophones, accelerometers, etc.). These seismic sensors produce signals that represent the detected seismic waves reflected from the subsurface structures. Signals from the seismic sensors may be processed to yield information about the content and characteristics of the subterranean structure and/or to generate images of the subsurface. To process information about the content and characteristics of the subterranean structure and/or to generate images of the subsurface, the reflected data must be analyzed with the effects of the seismic survey process, the interactions of waves with rock structures, the effects of wave transmission through the Earth structures, the effects of noise and interactions between waves all being analyzed and processed to convert the seismic signals generated by a seismic source into data providing information about the content and characteristics of the subterranean structure and/or to generate images of the subsurface.

A land-based seismic survey arrangement may include a deployment of an array of seismic sensors on the ground, which may comprise receivers distributed in a borehole and/or at the earth-air interface. A marine survey arrangement can include a seabed cable or other arrangement of seismic sensors placed on the seafloor or other water bottom surface, or can include a seismic source assembly and a seismic sensor streamer towed through a body of water.

The detected seismic waves reflected from the subsurface structures may comprise primaries, which have been reflected from the subsurface structures once, and multiples, which have been reflected from the subsurface structures more than once. The multiples may comprise free-surface multiples, which are multiples that have underside reflections at the free surface (the earth-air or water-air interface), and internal multiples, which are multiples that have underside reflections at the subsurface structures. Multiples with characteristics of both free-surface and internal multiples may also be present. Multiples may require specific processing approaches, which can comprise processing the data to a state where the multiples have been removed as noise or analyzing the multiples as signal to obtain information about the content and characteristics of the subterranean structure and/or to generate images of the subsurface.

In general, multiples have been removed from seismic data tin order to generate a seismic image. More, recently, multiples have been used as signal to generate a seismic image. However, previous seismic survey techniques have not compensated for missing recorded data when processing multiples as signal and, therefore any areal illumination gains from using the multiples as signal were limited.

Methods that use recorded free-surface multiples as signal (whether in combination with recorded primaries or not and encompassing any treatment or otherwise of internal multiples), but take no steps to compensate for missing data map some of the recorded free-surface multiples incorrectly into the subsurface, leading to cross-talk and other types of noise in the seismic image. This noise degrades seismic image quality and may be difficult to remove. Uncompensated missing recorded data limits the seismic image quality gains, e.g. in resolution or areal illumination, that could otherwise be gained from including the recorded free-surface multiples as signal. In both seismic imaging methods that do not use recorded free-surface multiples as signal, and in seismic imaging methods that do use recorded free-surface multiples as signal, whether in combination with the recorded primaries or not, the requirement of quasi-complete data, that is, good coverage by both shots and receivers, also affects the design of seismic surveys to acquire such data.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth.

Embodiments of the present invention provide a method that compensates for incomplete recording of seismic data when constructing seismic images using both recorded primaries and recorded multiples, such as free-surface multiples. In this context, "incomplete recording" refers to entire seismic data traces that have not been recorded, for example because the physical recording system has a finite width, length, or has receivers that are placed at discrete locations. When knowledge of the geometry of the physical recording system is included as input, the method can compensate for the data that were not recorded by calculating synthetic data to substitute for the unrecorded in parts of the imaging process. This enables seismic image quality enhancements, such as extending areal illumination or increasing resolution, from using the multiples as signal.

The benefits of compensating for recorded seismic data incompleteness include among other things allowing the application of using multiples, such as free-surface multiples, as signal in a wider variety of seismic imaging cases (e.g. different acquisition geometries, geographic locations), and allowing for design of acquisition system with fewer or more widely spaced sources or receivers without comprising seismic image quality.

In an embodiment of the present disclosure, synthetic survey data may be generated using a one-way or two-way wave propagator based on a current model of a target structure. In embodiments of the present disclosure, the current model may be modified to reduce a difference between the synthetic survey data and observed survey data, while maintaining unchanged a velocity component of the current model; where the modifying of the current model produces a modified model. In embodiments of the present disclosure, the modified model is used to reduce an effect of multiples in the target structure.

Previously data processing workflows dedicated significant efforts to removing free-surface multiples from recorded seismic data prior to using the primaries in the recorded data for building seismic images. This required extensive processing of the data and multiple removal may not be complete so that the processed properties of the Earth's interior from the processed data were in effect "blurry." In some embodiments of the present disclosure, the free-surface multiples are treated as signal instead of as noise, to build a seismic image of the subsurface by simultaneous fitting of both recorded primary and recorded free-surface multiple data.

In some embodiments of the present disclosure, the imaging method is modified to compensate for incomplete recording of the recorded seismic data. The compensation is done by using the down-going data components where they have been recorded, and a synthetic estimate of those down-going data components that have not been recorded, in propagating wavefields.

In embodiments of the present disclosure, the output from the method is a high-fidelity seismic image of the subsurface in a geographic area of interest, where the area of interest is specified by the input recorded seismic data and user-defined parameters that are required to apply the algorithms to this data. This image can be interpreted as being produced simultaneously by both the primaries and the free-surface multiples present in the input data. The way in which the processes and associated product algorithms construct the seismic image compensates for incompleteness of recorded seismic data, where such incompleteness is commonly unavoidable and occurs as a result of a number of factors related to the acquisition of the recorded seismic data, such as the recording seismic survey having finite aperture or discrete spatial recording locations.

In embodiments of the present disclosure, the output image may be produced simultaneously by both the primaries and the free-surface multiples present in the input recorded seismic data, this is in sharp contrast to conventional seismic imaging techniques. Preprocessing of the recorded seismic data prior to being input into a set of imaging algorithms may differ between the techniques, including product algorithms and algorithms, used to construct conventional seismic images. That the techniques explicitly compensate for the sampling incompleteness of the input recorded seismic data is different from any other means of constructing seismic images.

The image produced by the processes of the present disclosure and the associated product algorithms serves the same purpose of interpretation as other seismic images, but have additional features (e.g. increased resolution or extended areal illumination) that convert the seismic survey data into clearer interpretations of the subsurface/rock structures.

Other or additional features will become apparent from the following description, from the drawings, and from the claims.

BRIEF DESCRIPTION OF THE DRAWINGS

Some implementations are described with respect to the following figures, where:

FIGS. 6(*a*)-6(*d*) illustrate examples of application of embodiments of the present invention to seismic survey data.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

A survey arrangement to survey a target structure, such as a subsurface structure, can include an arrangement of survey receivers and survey sources. In seismic surveying, the survey receivers are seismic sensors that are used to measure seismic data, such as displacement, velocity, or acceleration. Seismic sensors can include geophones, accelerometers, microelectromechanical systems (MEMS) sensors (e.g. MEMS accelerometers), or any other types of sensors that measure translational motion of a surface in one or more directions. A MEMS sensor includes elements with sizes in the nanometers or micrometers range. One or more of the elements of the MEMS sensor may be moveable.

A seismic sensor that measures translational motion can be referred to as a particle motion sensor. A particle motion sensor can refer to any of the sensors listed above. A particle motion sensor can measure translational data along at least a given direction. In some examples, a particle motion sensor can include multiple sensing elements that measure translational data in multiple different directions.

An arrangement of particle motion sensors can be provided at (or proximate) an earth surface (land surface or bottom surface of a body of water, such as a seafloor) to measure seismic waves reflected from a subsurface structure, in response to seismic waves (or impulses) produced by one or more seismic sources and propagated into an earth subsurface. A seismic source can include an air gun, a vibrator, an explosive, or any other source that is able to produce acoustic energy.

In a seismic survey operation, multiples can affect accuracy when characterizing a subsurface structure. Characterizing a subsurface structure can include producing an image of the subsurface structure, producing a model of the subsurface structure, and so forth. Within a subsurface structure including geological strata that have different properties, reflections of seismic energy can occur between the different geological strata (or layers), or between the different geological strata (or layers) and the free surface (such as the earth-air or water-air interface).

Multiple reflections of seismic energy can occur in the subsurface structure. Seismic multiples can experience at least one downward reflection (assuming the case of a horizontally layered subsurface structure and survey sources and receivers at the top surface (horizontal surface) of the model), and a total of at least three reflections along their wave propagation paths. When the downward reflection (the underside reflection) is at the free surface, the multiples are referred to as free-surface multiples. When the downward reflection is deeper than the free surface, the multiple is referred to as an internal multiple. Events with two reflections in the subsurface can be referred to as prismatic waves.

Because multiples can share similar kinematic properties with primary wavefields (wavefields reflected from a target element in a subsurface structure), the multiples can be difficult to remove. The multiples can stack coherently with the primary wavefields when using some imaging techniques to produce images of a subsurface structure. Consequently, the multiples can provide a source of error in the quantitative estimation of subsurface structure properties based on measured seismic data.

In accordance with some implementations, techniques or mechanisms are provided to build an earth model (of the subsurface structure) that is consistent with measured seismic data that includes internal and free-surface multiples.

Figure 1:
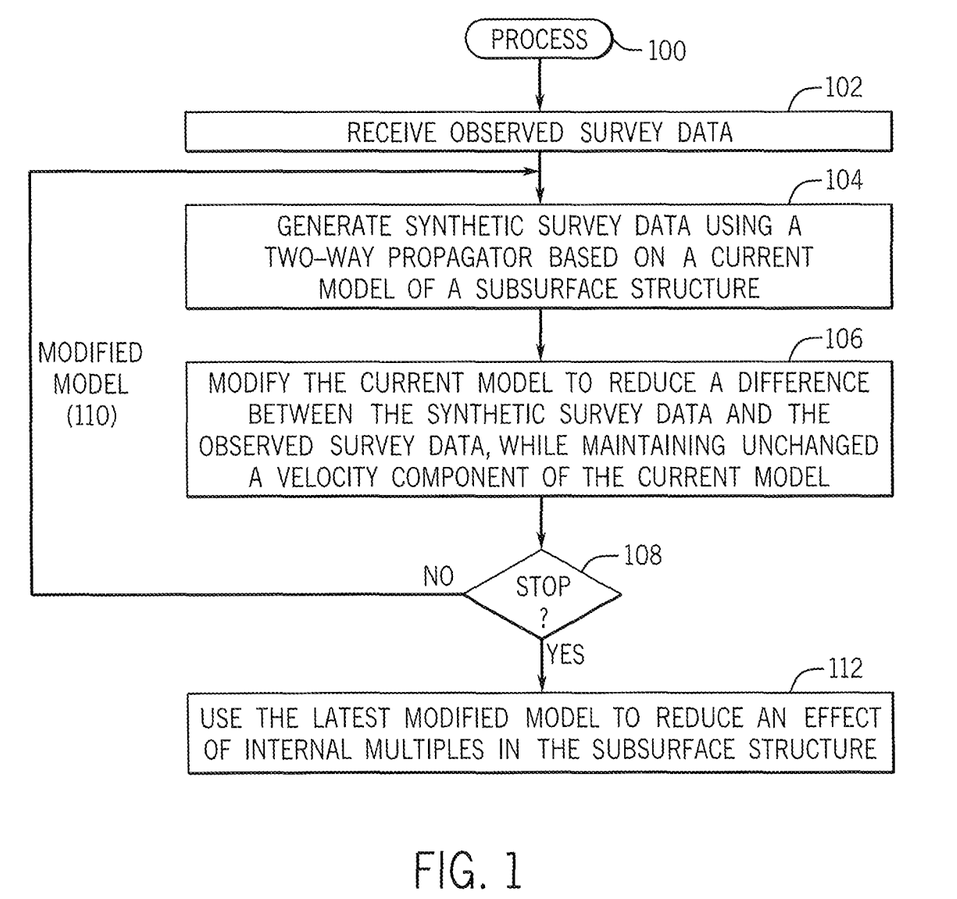
FIG. 1 is a flow diagram of a process of characterizing a target structure according to some implementations.

FIG. 1 is a flow-type diagram of a process 100 of characterizing a subsurface structure according to some implementations. Although techniques according to some implementations can be applied to the attenuation of internal multiples, the approach described here can also apply to surface multiples, to prismatic waves, or to internal multiples after simulating acquisition at a deeper datum surface (redatuming). The term "multiple" as used herein can refer to any of the foregoing.

Note that although reference is made to characterizing a subsurface structure underneath an earth surface (e.g. land surface or water bottom surface) in the present disclosure, it is noted that techniques or mechanisms according to further implementations can be used to characterize other types of target structures. Examples of other target structures include human tissue, a mechanical structure, plant tissue, animal tissue, a solid volume, a substantially solid volume, a liquid volume, a gas volume, a plasma volume, and so forth.

The process 100 of FIG. 1 receives (at 102) observed survey data, which includes survey data measured by survey receivers, which can be provided in a land-based or marine survey arrangement. The process 100 further generates (at 104) synthetic survey data using a propagator based on a current model (e.g. earth model) of the subsurface structure. The generation of the synthetic survey data can be performed by a simulator using the current model. The simulator includes or uses either a two-way propagator or a one-way propagator. A two-way propagator is a propagator that can propagate waves simultaneously in multiple directions in the subsurface structure, and is based on a solution of a full-wave equation. In contrast, a one-way propagator propagates waves in a single direction in the subsurface structure—usually either up or down—and is based on the solution of a wave equation expanded around a single direction of propagation. Propagators can be restricted to not generate all reflections, e.g. a two-way propagator with no free surface will not generate free-surface multiples.

In the first iteration of task 104, the current model comprises an initial model of the subsurface structure. The initial model provides an initial estimate of the characteristics of the subsurface structure. With each iteration of the process 100, the model can be incrementally refined (updated) to provide incrementally better estimates of the characteristics of the subsurface structure.

The process 100 modifies (at 106) the current model to reduce a difference between the synthetic survey data and the observed survey data, while maintaining unchanged a velocity component of the current model. The modifying (at 106) of the current model produces a modified model.

In examples where the initial model and modified model are earth models that represent a subsurface structure, each model can be parameterized using various parameters. For example, a model can include any of the following combinations of parameters: (1) a velocity parameter and an acoustic impedance parameter, (2) a velocity parameter and a density parameter, (3) a velocity parameter and a log-impedance parameter, or (4) a velocity parameter and a reflectivity parameter.

In accordance with embodiments of the present disclosure, in the modifying performed at 106, the update of the model parameters can be accomplished while maintaining the velocity constant—in other words, different models in the model modification process can include the same values of the velocity parameter. Note that within a model of a subsurface structure, velocity can vary as a function of position (e.g. depth and/or other dimension) in the model. In accordance with embodiments of the present disclosure, within a model, velocities can be different for different positions in the subsurface structure. However, across models refined in the modification process, the set of velocities for the subsurface structure remains unchanged from model to model. In accordance with embodiments of the present disclosure, while the set of velocities remains unchanged from model to model, another parameter (or parameters) of the model can change as the model is being updated. Note that constraints can be applied to restrict the updates to specific target zones, or exclude updates to some strong reflectors, such as for instance the free surface or a water bottom.

The process 100 next determines (at 108) whether a stopping criterion has been satisfied. An example of a stopping criterion is whether the synthetic survey data differs from the observed survey data by less than a specified threshold amount.

If the stopping criterion is not satisfied, then the process 100 performs another iteration of tasks 104 and 106. In the next iteration of task 104, the modified model 110 is used as the current model. The modified model 110 is then further modified in the next iteration of the modifying task 106.

Once the stopping criterion is satisfied, as determined at 108, the process 100 uses (at 112) the latest modified model produced by the latest iteration of the modifying task 106 to reduce an effect of multiples in the target structure.

In some implementations, the latest updated model can be interpreted directly as being uncorrupted by internal multiples. Interpreting the latest updated model as an image of the subsurface structure can refer to employing the latest updated model as the image of the subsurface structure, where the image is uncorrupted by internal multiples or where the unfavorable effect of internal multiples has been mitigated. Note that the process 100 of FIG. 1 has taken into account the effects of internal multiples, so that the latest updated model can be employed as the image with mitigated effects from internal multiples. Stated differently, interpreting the latest updated model as being an image that is free of internal multiples can refer to developing an image in which internal multiple reflections present in the data are not visible as spurious events, and so can be further analyzed by methods based on a single reflection point model.

In other implementations, the latest updated model can be used to predict internal multiples, which can then be subtracted from the observed survey data to produce survey data that is free of the internal multiples.

In other implementations, the latest updated model can be interpreted directly as being formed with free-surface multiples contributing as signal. Interpreting the latest updated model as an image of the subsurface structure can refer to employing the latest updated model as the image of the subsurface structure, where the image contains favourable features arising from the contribution of free-surface multiples as signal, is uncorrupted by free-surface multiples as noise, or where the unfavourable effect of free-surface multiples has been mitigated. Note that the process 100 of FIG. 1 has taken into account the effects of free-surface multiples, so that the latest updated model can be employed as the image with desirable contributions from free-surface multiples. Stated differently, interpreting the latest updated model as being an image that is free of free-surface multiple noise can refer to developing an image in which free-surface multiple reflections present in the data are not visible as spurious events and in which some features of the image may arise from favorable contributions from free-surface multiples, and so can be further analyzed by methods based on a single reflection point model.

In other implementations, the latest updated model can be used to predict free-surface multiples, which can then be subtracted from the observed survey data to produce survey data that is free of the free-surface multiples.

In some examples, the process 100 of FIG. 1 may comprise a full-waveform inversion (FWI) process. An FWI process minimizes a misfit, E, between observed survey data, d, and predicted (synthetic) survey data with respect to an earth model, m. This can be computed in a least-squares sense, such that:

$$E(m)=|d-f(m)|^2, \qquad \text{(Eq. 1)}$$

where, the predicted survey data is generated by a modeling operator, f, which acts on the model, m. The FWI process can potentially image internal and/or free-surface multiples, which can be modeled using the nonlinear modeling operator, f. Note that other causes of nonlinearity can be present. For example, the phase of data can depend strongly on velocity. Thus, if velocity is varied from model to model during the iterative processing to update the model, the problem of the FWI process becomes increasingly nonlinear and may not produce accurate results.

However, as discussed above, in accordance with embodiments of the present disclosure, by keeping the velocity fixed between model updates, the source of nonlinearity due to variation in velocity from model to model can be removed. In accordance with some implementations, an FWI process in which the velocity is fixed is referred to as a fixed-velocity FWI process.

The fixed-velocity FWI process can avoid nonlinearities caused by changes in data phase due to changes in velocity across models. However, nonlinearity caused by internal and/or free-surface multiple scattering will be included in the modeling produced using the fixed-velocity FWI process. Other causes of nonlinearity, such as elastic scattering behavior, may also be included in the modeling, however, it can be assumed that such other nonlinearities are relatively small.

Although the fixed-velocity FWI process fixes the velocity parameter, various choices are available regarding how scatterers that produce internal and/or free-surface multiples are parameterized in a model. For example, any or some combination of the following parameters can be updated in the iterative fixed-velocity FWI process: density, acoustic impedance, log-impedance, reflectivity, and so forth.

The modeling performed by the fixed-velocity FWI process can be extended to include non-local scattering, such as finite subsurface-offset or finite time-shifted contributions for example.

In some implementations, the fixed-velocity FWI process can work primarily with reflections as opposed to refractions and diving waves. Also, the fixed-velocity FWI process may not involve frequency cycling.

In some examples, the fixed-velocity FWI process may be sensitive to an absolute amplitude of a source wavelet used in the forward modeling of the fixed-velocity FWI process. Forward modeling refers to producing synthetic survey data using a current model for the purpose of updating the initial or a different model. A source wavelet refers to a wavefield produced by a survey source (e.g. seismic source).

A variable projection technique can be used to provide an estimate of the source wavelet at the same time as the model. The variable projection technique can provide the estimate of the source wavelet by matching the synthetic survey data to the observed survey data. The variable projection method substitutes the linear solution for the source function back into objective function (of Eq. 1), so that the source depends implicitly on the earth model parameters and is no longer a separate unknown.

As noted above, the updated model produced from the fixed-velocity FWI process can be interpreted directly as an image of the subsurface structure that is uncorrupted by internal an/or free-surface multiples (or that has multiples mitigated). In other implementations, the updated model can be used to predict internal and/or free-surface multiples, which can then be subtracted (e.g. using adaptive subtraction) from the observed survey data to produce survey data that is free of the these multiples.

As further examples, the survey data with mitigated multiples can be imaged with another technique. An example of such another technique is a reverse-time migration (RTM) technique. Image data produced using an RTM technique can be inverted with a scheme that takes into account elastic amplitude-versus-offset effects. For example, a solution to an elastic equation can be used, such as by using Amplitude Variations with Offset (AVO) inversion.

Figure 2:
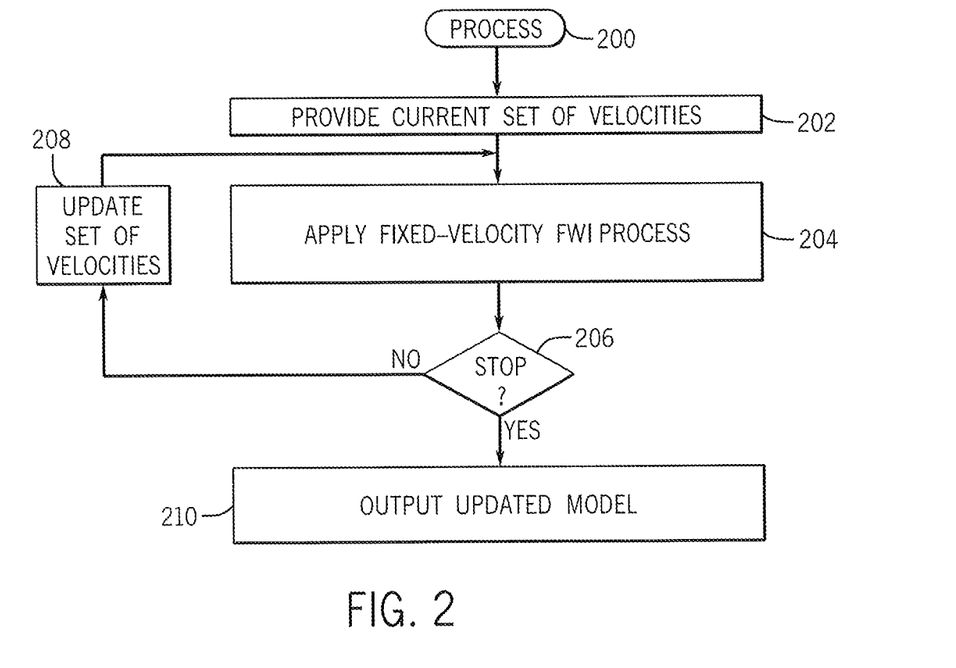
FIG. 2 is a flow diagram of a process of characterizing a target structure according to further implementations.

FIG. 2 is a flow diagram of a process 200 according to further implementations. As discussed above, a fixed-velocity FWI process can be used to update a model. In the process 200 of FIG. 2, the fixed-velocity FWI process can be used as part of an overall process that also allows velocity to be changed.

The process 200 provides (at 202) a current set of velocities in a current model. In the first iteration of task 202, the current model is the initial model. The process 200 then applies (at 204) the fixed-velocity FWI process (similar to process 100 in FIG. 1) using the current set of velocities. The fixed-velocity FWI process applied (at 204) updates other parameters (e.g. density, impedance, etc.) of the model with each iteration of the fixed-velocity FWI process, while maintaining the current set of velocities fixed.

Next, the process 200 determines (at 206) if a stopping criterion is satisfied. If not, then the set of velocities is updated (at 208), such as by using an FWI process that allows the velocity component to be updated. The updated set of velocities is then used in the next iteration of the fixed-velocity FWI process (at 204). Once the stopping criterion is satisfied, the process 200 outputs (at 210) an updated model.

Effectively, the process 200 alternates between updating velocity and another parameter, e.g. density, impedance or the like.

Figure 3:
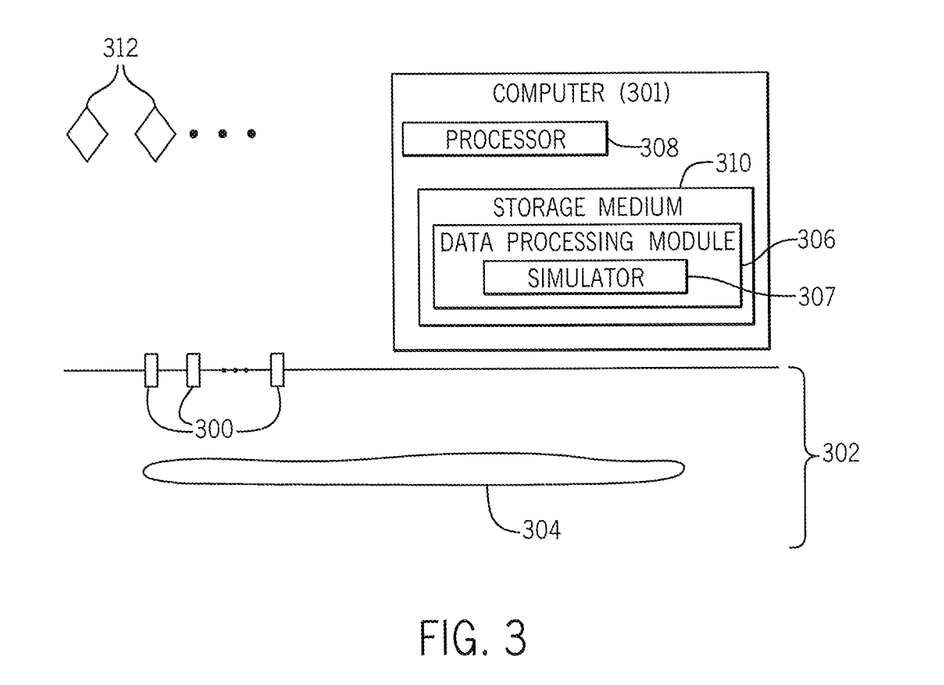
FIG. 3 is a schematic diagram of an example survey arrangement according to some implementations.

FIG. 3 is a schematic diagram of a land-based survey arrangement that includes survey sensor devices 300 (which can include any of the sensors discussed further above). In different examples, the sensor devices 300 may be deployed in a marine survey arrangement.

Measurements acquired by the sensor devices 300 are transmitted (over a cable or wirelessly) to a computer 301, where the measurements are recorded (stored in a storage medium or storage media 310). The measurements are made by the sensor devices 300 in response to seismic waves produced by one or more seismic sources 312. The seismic waves are propagated into a subsurface structure 302, and reflected from a subsurface element 304 of interest. The reflected waves are detected by the sensor devices 300.

Although not shown in FIG. 3, the subsurface structure 302 can include different layers that can cause internal multiples to be present in the measured survey data, as observed by the sensor devices 300. Furthermore, although not show in FIG. 3, the subsurface structure 302 can include a free surface (an earth-air or a water-air interface) that can cause free-surface multiples to be present in the measured survey data, as observed by the sensor devices 300.

The computer 301 includes a data processing module 306, which can be implemented with machine-readable instructions that are executable on one or more processors 308 coupled to the storage medium (or storage media) 310. A processor can include a microprocessor, microcontroller, processor module or subsystem, programmable integrated circuit, programmable gate array, or another control or computing device. The data processing module 306 can include a simulator 307 that can employ a two-way or a one-way propagator as discussed further above.

The storage medium (or storage media) 310 can include one or more non-transitory computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Figure 4:
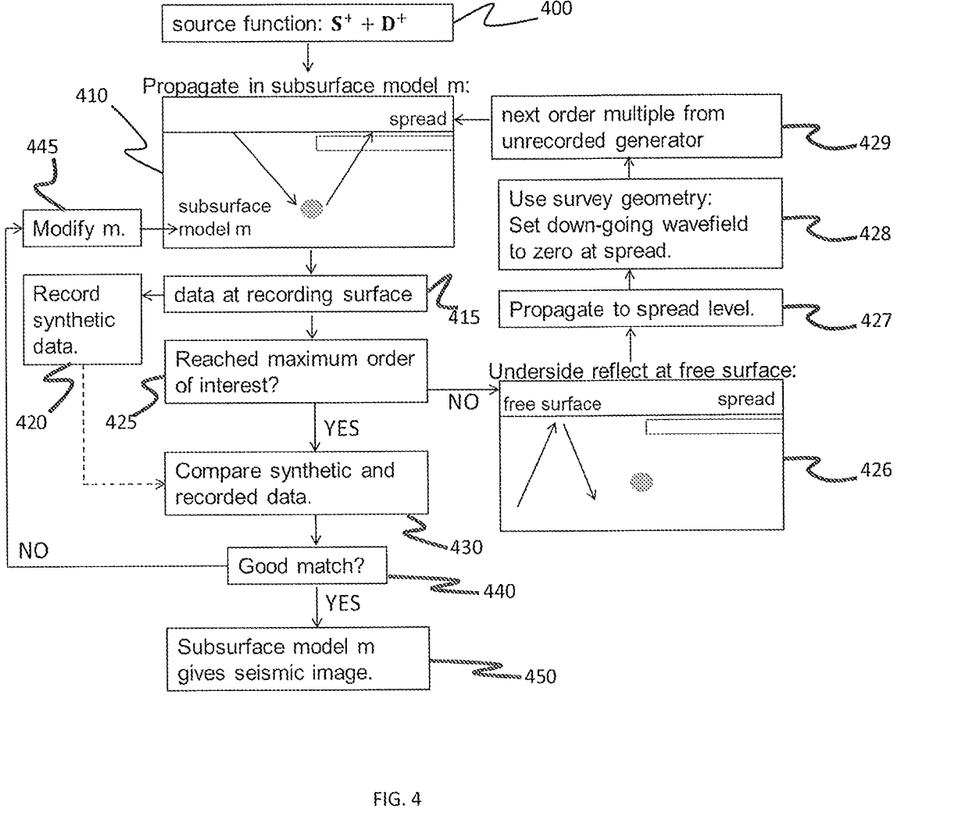
FIG. 4 is a flow-type illustration of a process of characterizing a target structure according to some implementations of compensating for incomplete data.
Figure 5:
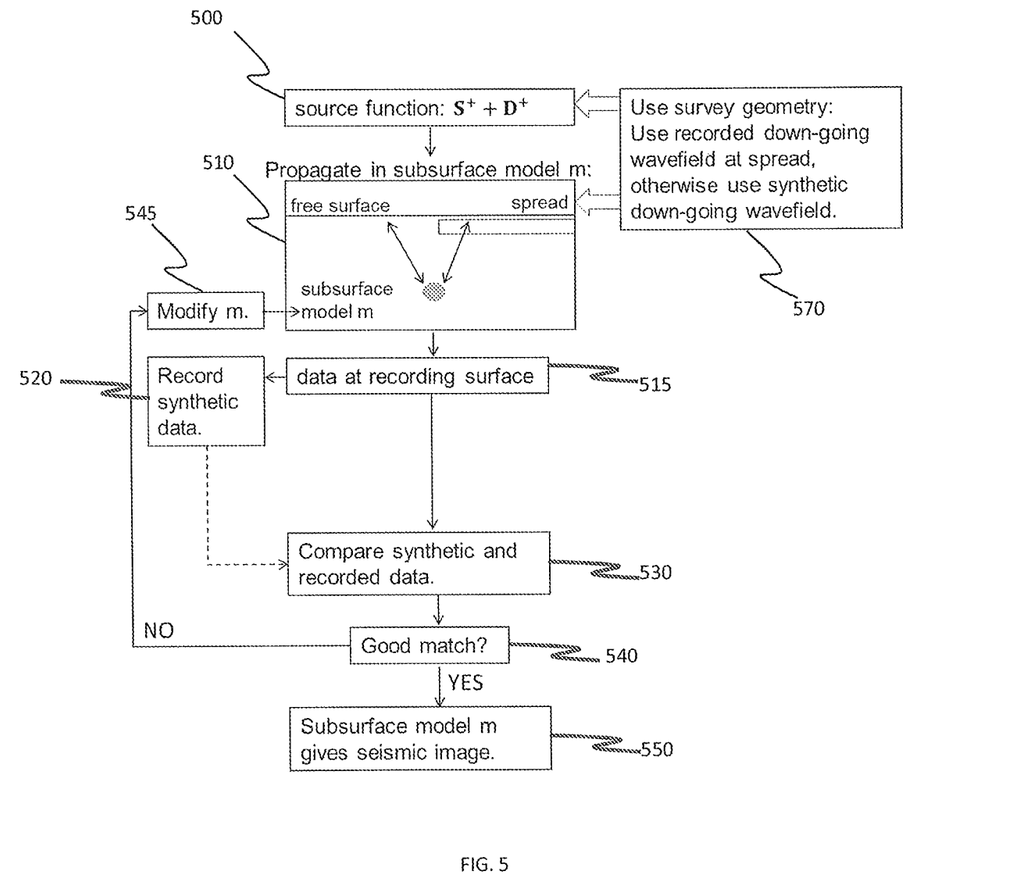
FIG. 5 is a flow-type illustration of a process of characterizing a target structure according to some other implementations of compensating for incomplete data.

FIGS. 4 and 5 provide two flow-type illustrations, each of an example method of transforming data from a seismic data comprising incomplete data into information regarding/an image of an interior section of the earth, including the rock formations therein.

FIG. 4 is provided to illustrate an example method of application of embodiments of the present invention using a one-way wavefield propagator, or a two-way wavefield propagator that does not contain a free surface.

In 400, a source wavelet and some recorded down-going seismic data containing primaries and some free-surface multiples is provided. The recorded seismic data includes survey data measured by survey receivers, which can be provided in a land-based or marine survey arrangement.

In the first iteration of task 410, the current subsurface model comprises an initial model of the subsurface structure. The initial model provides an initial estimate of the characteristics of the subsurface structure. The source wavelet and some recorded seismic data is propagated in this current subsurface model in such a way that where recorded seismic data exists it replaces corresponding synthetic components in the synthetic down-going wavefield. Following interaction with the current subsurface model, this propagation yields an up-going synthetic seismic wavefield.

At 415, locations at which the synthetic up-going seismic wavefield of 410 is to be sampled are provided as a recording surface. In 420, up-going synthetic seismic data are obtained by sampling the synthetic up-going wavefield from 410 at receiver locations provided in 415.

425 determines whether a stopping criterion (e.g. 'maximum order of interest') for generating additional orders of free-surface multiples has been reached. An example of a maximum order of interest is each input component (at 400) acting as a generator for two additional orders of multiples in the synthetic seismic data of 420.

If the stopping criterion is not satisfied, then the flow continues with the execution of 426. At 426, the up-going synthetic seismic wavefield of 410 is underside reflected at the free surface, transforming the up-going synthetic seismic wavefield into a reflected down-going synthetic seismic wavefield.

At 427, the reflected down-going synthetic seismic wavefield is one-way propagated to the same level as the recording surface of 415.

At 428, the reflected down-going synthetic seismic wavefield is set to zero at receiver locations provided in 415. This gives rise to 429, wherein the reflected down-going synthetic seismic wavefield at locations not containing any receiver as provided in 415 is used as synthetic generator for the next order of free-surface multiples whose generators were not present in the recorded seismic data.

The process then continues at 410, where the subsurface model remains the same until the maximum order of interest stopping criterion of 425 is reached. At 420, the up-going synthetic seismic data are added to until the stopping criterion at 425 is reached.

When the stopping criterion at 425 is reached, the up-going synthetic seismic data at 420 are compared to the up-going recorded seismic data, which is provided. Task 430 establishes the fit between the synthetic and recorded seismic data.

At 440, the fit between the synthetic and recorded seismic data is evaluated. An example of a fit evaluation criterion is whether the synthetic seismic data differs from the observed seismic data by less than a specified threshold amount.

If the fit evaluation criterion is not satisfied, the subsurface model is modified in task 445 in such a way that the fit between the synthetic and recorded seismic data is improved.

The process then performs iteration of tasks 410, 415, 420, 425, and depending on the outcome of 425, of tasks 426, 427, 428, and 429, followed by tasks 430 and 440. In the next iteration of tasks starting at 410, the modified model produced by task 445 is used as the current model.

Once the fit evaluation criterion is satisfied, as determined at 440, the process uses (at 450) the latest modified model produced by the latest iteration of task 445 as the output seismic image.

FIG. 5 is provided to illustrate an example method of application of embodiments of the present invention using a two-way wavefield propagator containing a free surface.

In 500, a source wavelet and some recorded down-going seismic data containing primaries and some free-surface multiples is provided. The recorded seismic data includes survey data measured by survey receivers, which can be provided in a land-based or marine survey arrangement.

In the first iteration of task 510, the current subsurface model comprises an initial model of the subsurface structure. The initial model provides an initial estimate of the characteristics of the subsurface structure. The source wavelet and some recorded seismic data is propagated in this current subsurface model in such a way that where recorded seismic data exists it replaces corresponding synthetic components in the synthetic down-going wavefield, as shown in 570. In other words, task 510 propagates the source wavelet and some recorded seismic data in a subsurface model in such a way that all appropriate orders of primaries and free-surface multiples, independent of whether recorded seismic data are complete with respect to their generators or not, are generated. Following interaction with the current subsurface model, this propagation yields a synthetic seismic wavefield.

In 515, locations at which the synthetic seismic wavefield of 510 is to be sampled are provided as a recording surface. In 520, up-going synthetic seismic data are obtained by sampling the synthetic wavefield from 510 at receiver locations provided in 515 and possibly performing an up-/down-going wavefield separation.

The up-going synthetic seismic data at 520 are compared to the up-going recorded seismic data, which is provided. Task 530 establishes the fit between the synthetic and recorded seismic data.

At 540, the fit between the synthetic and recorded seismic data is evaluated. An example of a fit evaluation criterion is whether the synthetic seismic data differs from the observed seismic data by less than a specified threshold amount.

If the fit evaluation criterion is not satisfied, the subsurface model is modified in task 545 in such a way that the fit between the synthetic and recorded seismic data is improved.

The process then performs another iteration of tasks 510, 515, 520, 530 and 540. In the next iteration of tasks starting at 510, the modified model produced by task 545 is used as the current model.

Once the fit evaluation criterion is satisfied, as determined at 540, the process uses (at 550) the latest modified model produced by the latest iteration of task 545 as the output seismic image.

FIGS. 6(a)-6(d) illustrate examples of application of embodiments of the present invention to seismic survey data. The process shown in FIG. 4 has been used to obtain these examples, which are all with synthetic data.

Figure 6A:
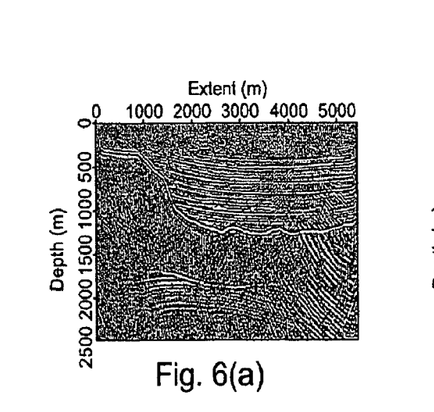
Figure 6B:
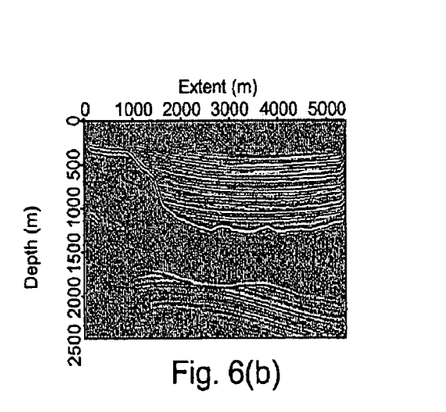

The images in FIGS. 6(a) and 6(b) are produced from a seismic survey in which there are recorders everywhere at the free surface, spanning the imaging volume in lateral extent (though not sampling). This is the best-case scenario for no missing data compensation, as data at all offsets have been recorded, though some data is still missing due to the coarse sampling.

The image illustrated in FIG. 6(a) is obtained with no missing data compensation, with an embodiment of the base process described in FIG. 1. The image in FIG. 6(b) is obtained with missing data compensation, in accordance with embodiments of the present disclosure, following the process described in FIG. 4. The image illustrated in FIG. 6(b) is less contaminated by cross-talk noise than is the image of FIG. 6(a) (this noise is seen as the striping in the bottom right-hand corner of FIG. 6(a)), showing how the missing data compensation can improve image quality even in situations when an embodiment of the base method illustrated in FIG. 1 is expected to perform optimally.

Figure 6C:
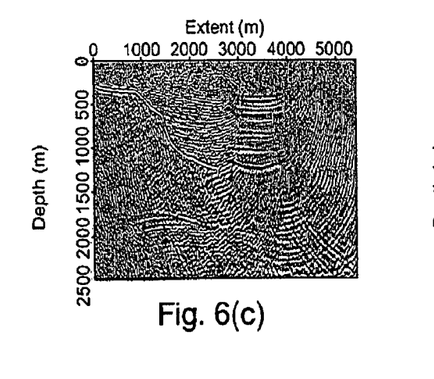
Figure 6D:
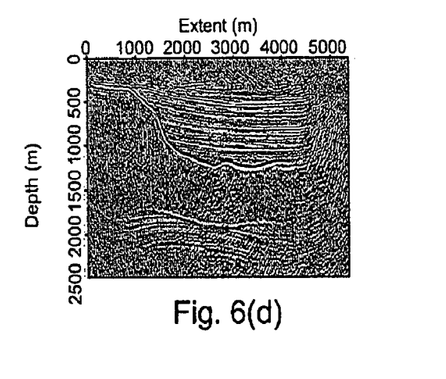

FIGS. 6(c) and 6(d) are produced from a seismic survey where there are recorders positioned from 0 to 2700 meters in lateral extent at the free surface, with near-offset data missing. This is a poor scenario for no missing data compensation, as substantial data has not been recorded, in addition to the sampling being coarse.

In FIG. 6(c) the image provided is obtained with no missing data compensation (an embodiment of the base process illustrated in FIG. 1). In FIG. 6(d) the image is obtained with missing data compensation, in accordance with embodiments of the present disclosure. Again, the image of FIG. 6(d), produced in accordance with embodiments of the present invention, is less contaminated by cross-talk noise than is the image shown in FIG. 6(c) produced by an embodiment of the base technique of FIG. 1 (the noise is seen as the striping in the bottom right-hand corner of the FIG. 6(c)). FIG. 6(d) also appears laterally continuous and is more widely illuminated FIG. 6(c). In fact, FIG. 6(c) has the appearance of two disjoint images, joined together at 2700 m lateral extent, where the data coverage stops. This demonstrates how the missing data compensation of a method of the present disclosure greatly improves image quality.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
    receiving, by a system including a processor, observed survey data containing primaries and free-surface multiples;
    generating, by the system, synthetic survey data using a wave propagator based on a current model of a target structure;
    modifying, by the system, the current model to reduce a difference between the synthetic survey data and the observed survey data, while maintaining unchanged a velocity component of the current model, wherein the modifying of the current model produces a modified model; and
    using, by the system, the modified model as an image of the target structure that is illuminated by both the primaries and free-surface multiples to reduce an effect of multiples in the target structure.

2. The method of claim 1, wherein using the modified model as an image of the target structure that is illuminated by the both primaries and free-surface multiples to reduce an effect of multiples in the target structure comprises:
    generating predicted multiples using the modified model; and
    subtracting the predicted multiples from the observed survey data to produce survey data with an effect of multiples mitigated.

3. The method of claim 2, further comprising:
    reiterating the generating of the synthetic survey data and the modifying until a stopping criterion is satisfied, wherein the reiterating of the generating of the synthetic survey data comprises generating synthetic data using a modified model from a prior iteration as the current model, and the reiterating of the modifying comprises modifying the modified model from the prior iteration to produce a further modified model, and wherein the using uses a modified model from a last iteration of the modifying.

4. The method of claim 2, wherein the current model and the modified model are parameterized with parameters selected from the group consisting of: (1) a velocity parameter and an acoustic impedance parameter, (2) a velocity parameter and a density parameter, (3) a velocity parameter and a log-impedance parameter, and (4) a velocity parameter and a reflectivity parameter.

5. The method of claim 2, wherein the current model and the modified model are parameterized with extended parameters comprising non-local scattering parameters.

6. The method of claim 2, wherein the generating of the synthetic survey data and the modifying are part of a full-waveform inversion (FWI) process.

7. The method of claim 6, wherein the FWI process is a fixed-velocity FWI process in which iterative updates of a model of the target structure are performed while maintaining velocity fixed from model to model.

8. The method of claim 2, further comprising:
    estimating a source wavelet based on matching the synthetic survey data to the observed survey data.

9. The method of claim 2, further comprising:
    reiterating the generating of the synthetic survey data and the modifying using a fixed first set of velocities associated with the target structure to produce a latest updated model of the target structure;
    updating the first set of velocities to produce a second, different set of velocities; and
    reiterating the generating of the synthetic survey data and the modifying using the second set of velocities.

10. A system comprising at least one non-transitory storage medium storing instructions that upon execution cause the system to:
    receive observed survey data acquired using survey receivers, the observed survey data including primaries and free surface multiples;
    while a stopping criterion is not satisfied, iteratively performing:
        generating synthetic survey data using a wave propagator based on a current model of a target structure; and
        modifying the current model to reduce a difference between the synthetic survey data and the observed survey data, while maintaining unchanged a velocity component of the current model, wherein the modifying of the current model produces a modified model; and
    in response to the stopping criterion being satisfied, use the modified model produced by a latest iteration of the modifying as an image of the target structure that is illuminated by both the primaries and free-surface multiples to reduce an effect of multiples in the target structure.

11. The system of claim 10, wherein using the modified model produced by the latest iteration of the modifying as an image of the target structure that is illuminated by both the primaries and free-surface multiples to reduce an effect of multiples in the target structure comprises:
  generating predicted internal and/or free-surface multiples using the modified model produced by the latest iteration of the modifying; and
  subtracting the predicted multiples from the observed survey data to produce survey data with an effect of these multiples mitigated.

12. The system of claim 10, wherein the current model and the modified model are parameterized with parameters selected from the group consisting of: (1) a velocity parameter and an acoustic impedance parameter, (2) a velocity parameter and a density parameter, (3) a velocity parameter and a log-impedance parameter, and (4) a velocity parameter and a reflectivity parameter.

13. The system of claim 10, wherein iteratively performing the generating and the modifying is part of a fixed-velocity full-waveform inversion (FWI) process.

14. The system of claim 10, wherein the propagator is selected from a two-way propagator configured to propagate waves simultaneously in multiple directions in the target structure and a one-way propagator configured to propagate waves in one direction at a time in the target structure.

15. The system of claim 10, wherein the instructions upon execution cause the system to further estimate a source wavelet based on matching the synthetic survey data to the observed survey data.

16. A computer comprising:
  a storage medium to store observed survey data containing primaries and free surface multiples; and
  at least one processor configured to:
    generate synthetic survey data using a two-way wave propagator based on a current model of a target structure;
    modify the current model to reduce a difference between the synthetic survey data and the observed survey data, while maintaining unchanged a velocity component of the current model, wherein the modifying of the current model produces a modified model; and
    use the modified model as an image of the target structure that is illuminated by both the primaries and free-surface multiples to reduce an effect of multiples in the target structure.

17. The computer of claim 16, wherein the generating and the modifying are iteratively performed until a stopping criterion is satisfied, and the at least one processor is configured to, in response to the stopping criterion being satisfied, use the modified model from a latest iteration of the modifying as an image of the target structure that is illuminated by both the primaries and free-surface multiples to reduce an effect of multiples in the target structure.

18. A method of processing seismic data from a seismic survey of a subterranean section of the Earth, comprising:
  receiving, by a system including a processor, survey data recorded by a seismic receiver containing primaries and free-surface multiples, wherein the recorded survey data as a result of incomplete sampling in the seismic survey comprises incomplete seismic data;
  receiving, by the same system, the shot and receiver geometry of the seismic survey producing the recorded survey data;
  splitting, by the system, the recorded survey data into up-going and down-going wavefield components on a recording surface;
  generating, by the system, synthetic survey data on the recording surface using a source wavelet and a wave propagator based on a current model of a target structure, wherein recorded down-going wavefield components are used to replace corresponding components in a synthetic down-going wavefield during propagation and the synthetic survey data is used to provide substitute data for at least some incomplete parts of the recorded survey data such that complete synthetic survey data is generated from the recorded survey data and the synthetic survey data;
  modifying, by the system, the current model of the target structure to reduce a difference between the synthetic survey data and the recorded survey data while maintaining unchanged a velocity component of the current model, wherein the modifying of the current model produces a modified model; and
  using the modified model as an image of the target structure that is illuminated by both primaries and free-surface multiples.

19. The method of claim 18, wherein using the modified model as an image of the target structure that is illuminated by both primaries and free-surface multiples comprises using the modified model as an image of the target structure with presence of multiples mitigated.

20. The method of claim 18, wherein using the modified model as an image of the target structure that is illuminated by both primaries and free-surface multiples comprises:
  generating predicted multiples using the modified model; and
  subtracting the predicted multiples from the observed survey data to produce survey data with an effect of multiples mitigated.

21. The method of claim 18, further comprising:
  reiterating the generating of the synthetic survey data and the modifying until a stopping criterion is satisfied, wherein the reiterating of the generating of the synthetic survey data comprises generating synthetic data using a modified model from a prior iteration as the current model, and the reiterating of the modifying comprises modifying the modified model from the prior iteration to produce a further modified model, and wherein the using uses a modified model from a last iteration of the modifying.

22. The method of claim 18, further comprising:
  estimating the source wavelet by matching the synthetic survey data to the recorded survey data.

23. The method of claim 18, where the primaries may be separated from the free-surface multiples and discarded in the up-going recorded survey data component, the down-going recorded survey data component, or both.

* * * * *